P. G. Kleinpeter,
Stalk Chopper.
No. 93,453. Patented Aug. 10, 1869.
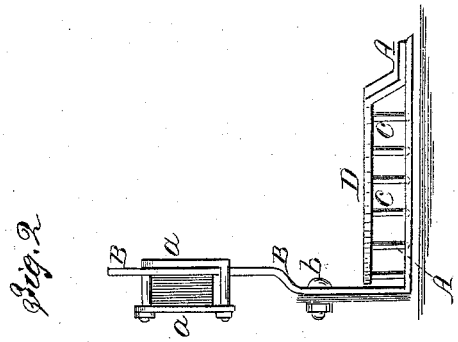
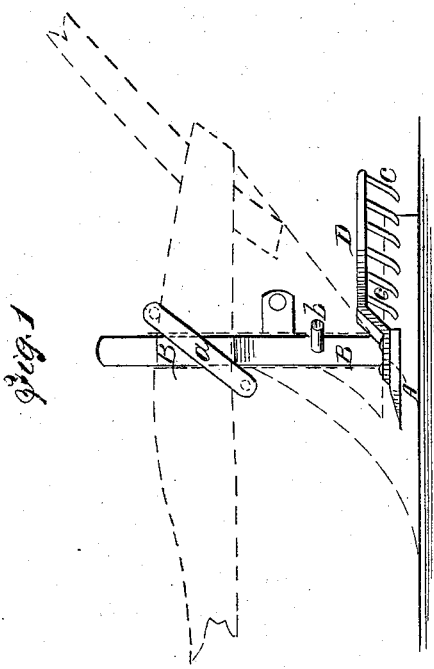
Witnesses:
Geo. W. Mabee
Geo. H. Brooks
Inventor:
P. G. Kleinpeter
Per Munn & Co
Attorneys.

United States Patent Office.

P. G. KLEINPETER, OF PLAQUEMINE, LOUISIANA.

Letters Patent No. 93,453, dated August 10, 1869.

IMPROVEMENT IN CANE AND STUBBLE-SHAVER.

The Schedule referred to in these Letters Patent and making part of the same.

To all whom it may concern:

Be it known that I, P. G. KLEINPETER, of Plaquemine, in the parish of Iberville, and State of Louisiana, have invented a new and improved Cane-Stubble Shaver; and I do hereby declare that the following is a full, clear, and exact description thereof, which will enable others skilled in the art to make and use the same, reference being had to the accompanying drawing, forming part of this specification, in which—

Figure 1 represents a side view of my improved cane-stubble shaver.

Figure 2 is a front view of the same.

Similar letters of reference indicate corresponding parts.

This invention has for its object to shave the stubbles of sugar-cane, so as to facilitate cultivation of the soil, and to enable the young sprouts from the old stubbles to grow at once.

The invention consists in the use of a horizontal knife, which is attached to the landside of an ordinary plow to cut the stubbles, while the plow is forced through the ground.

The invention also consists in attaching a rake to the outer end of the knife, for raking the cut stubbles into the furrow.

A, in the drawing, represents a metallic blade of suitable size, projecting from one side of a vertical shank or bar, B, which is, by suitable clasps, $a$, and hooks or screw-bolts, $b$, or both, fastened to the landside of a plow and its beam, as is indicated in fig. 1.

The front edge of the blade A is sharpened, to form a cutter for the purpose of shaving the stubbles of cut cane close above the ground.

The cultivation of the soil is thereby facilitated, as the cut stubbles are worked under the ground to rot in the same, and as the sprouts of the cane are enabled to grow without hindrance.

The cutter A is set somewhat higher than the lower edge of the mould-board, as shown.

A bar, D, may be attached to the outer end of the cutter A, to project obliquely backward from the same. On it are formed tines $c\ c$, which serve, as the device is moved along, to rake the cut stubbles into the furrow.

Having thus described my invention,

What I claim as new, and desire to secure by Letters Patent, is—

1. A cane-stubble shaver, consisting of the horizontal knife A, and vertical shank B, to be attached to the landside of a plow, substantially as and for the purpose herein shown and described.

2. The rake D, attached to the outer end of the stubble-shaver, substantially as and for the purpose herein shown and described.

P. G. KLEINPETER.

Witnesses:
J. STUHITNEY,
JOHN HARCOT.